United States Patent [19]

Houben et al.

[11] Patent Number: 5,211,009
[45] Date of Patent: May 18, 1993

[54] METHOD FOR THE REGENERATION OF PARTICULATE-FILTER SYSTEMS

[75] Inventors: Hans Houben, Wuerselen; Heinrich Berendes, Cologne; Reinhard Pusch, Leverkusen; Axel Rodemeister, Balingen-Engstlatt, all of Fed. Rep. of Germany

[73] Assignee: Kloeckner-Humboldt-Deutz AG, Cologne, Fed. Rep. of Germany

[21] Appl. No.: 805,115

[22] Filed: Dec. 10, 1991

[30] Foreign Application Priority Data

Dec. 17, 1990 [DE] Fed. Rep. of Germany ....... 4040279
Mar. 8, 1991 [DE] Fed. Rep. of Germany ....... 4107388

[51] Int. Cl.$^5$ .............................................. F01N 3/02
[52] U.S. Cl. ...................................... 60/274; 60/286; 73/118.1
[58] Field of Search ............... 60/286, 303, 284, 274; 73/38, 118.1

[56] References Cited

U.S. PATENT DOCUMENTS

| | | | |
|---|---|---|---|
| 4,566,271 | 1/1986 | French | 60/286 |
| 4,603,550 | 8/1986 | Shinzawa | 60/286 |
| 4,615,173 | 10/1986 | Usui | 60/286 |
| 4,987,738 | 1/1991 | Lopez-Crevillen | 60/286 |

FOREIGN PATENT DOCUMENTS 117534 9/1984 European Pat. Off. .

*Primary Examiner*—Douglas Hart
*Attorney, Agent, or Firm*—Charles L. Schwab

[57] ABSTRACT

A method for regeneration of a particulate filter in which the attainment of a stable idling operating condition of the diesel engine is waited for, at least within a specifiable time period after the starting of the diesel engine, rotation-speed signals of the diesel engine being registered in the specifiable time period, before a control device registers and evaluates further operating values and outputs control commands to devices of the particulate-filter system in order to insure reliable burning off of soot particles deposited in the particulate filter and prevent damage to the particulate filter due to incorrect control actions.

13 Claims, 10 Drawing Sheets

METHOD FOR THE REGENERATION OF PARTICULATE-FILTER SYSTEMS

TECHNICAL FIELD

This invention relates to a method for the regeneration of particulate-filter systems for the exhaust gases of diesel engines.

BACKGROUND OF THE INVENTION

Particulate-filter systems are used in order to reduce the particulate emission due to exhaust gases from diesel engines. A rise in pressure in the exhaust system is associated with increasing loading of a particulate filter. If a specified threshold pressure value for the exhaust-gas backpressure is exceeded, a regeneration of the particulate filter (burn-off of soot particles) must be performed.

From EP 0 117 534 there is known a method for the control of exhaust-gas emission of a diesel engine, in which method, when the pressure drop in the particulate filter reaches a predetermined value, a burner is ignited after the passage of a predetermined time from the beginning of the starting of the diesel engine, and is operated during a combustion period.

This method has the disadvantage that soot particles are burned off even if the particulate filter is not yet full. In this way the particulate filter is regenerated too frequently, which leads to a higher total thermal loading of the filter and to an elevated fuel consumption for regeneration.

OBJECTS AND BRIEF SUMMARY OF THE INVENTION

It is an object of the invention to control the regeneration of a particulate filter in such a fashion that a reliable burn-off of the soot particles deposited in the particulate filter is insured and damage to the particulate filter resulting from incorrect control actions is prevented.

In the method in accordance with the invention, the attainment of a stable operating condition of the diesel engine is waited for, at least within a specifiable time period after the starting of the diesel engine, rotation-speed signals of the diesel engine being registered, before the control device registers and evaluates further operating values and outputs control commands to devices of the particulate-filter system. A stable operating condition is achieved when the registered rotation-speed signals have exceeded a specified threshold value. When the diesel engine has reached the stable operating condition, further operating values are registered and evaluated by the control device and control commands are output by the control device to devices of the particulate-filter system. Thus, one device of the particulate-filter system consists of an air-delivery pump, which supplies combustion air to the burner. This air-delivery pump is turned on and off for short periods by a control command of the control device. A pressure jump in the combustion chamber resulting from the switching operation is evaluated by the control device in order to test a pressure sensor that is arranged in the combustion chamber. This has the advantage that this important device of the particulate-filter system is tested before the beginning of regeneration, so that reliable detection of the exhaust-gas backpressure upstream of the particulate filter is insured and incorrect control actions due to a defective transmitter are prevented.

In development of the invention, a nominal value for the exhaust-gas backpressure upstream of the particulate filter is calculated from a characteristic curve, as a function of the operating values of the diesel engine. This may refer, for example, to the rotation speed or the exhaust-gas temperature. This calculated nominal value for the exhaust-gas backpressure is compared by the control device to an actual value, which is supplied to the control device by a transmitter. This nominal/actual value comparison has the advantage that, on the basis of the operating values, the exhaust-gas backpressure expected upstream of the particulate filter is calculated from a characteristic curve for each operating point of the diesel engine and compared to the registered actual value of the exhaust-gas backpressure, so that reliable detection of loading of the particulate filter is given by this comparison.

In development of the invention, the calculations of the nominal exhaust-gas backpressure and the nominal-/actual value comparison are performed in a specifiable time period. This procedure over a specifiable time period has the advantage that sudden pressure fluctuations of the exhaust-gas backpressure, which can occur, for example, by means of a change in load on the diesel engine, do not lead to a premature beginning of regeneration.

In development of the invention, a specifiable nominal value of the combustion-chamber temperature is compared to an actual value of the combustion-chamber temperature, which the control device registers with a combustion-chamber temperature transmitter. With this comparison of the nominal combustion-chamber temperature value to the actual value of the combustion-chamber temperature, the temperature condition of the combustion chamber is monitored, so that a combustion-chamber required for burner starting need not be attained until before the beginning of the start phase. Furthermore, the fuel supply as well as the ignition of the burner is turned on by a control command of the control device for a specifiable time span. When the regeneration start conditions are attained, the air supply is turned on and the correct air supply is tested by evaluating the pressure jump in the combustion chamber. If no pressure jump should occur, the number of attempted starts is counted (accumulated). If the number is greater than a specified number (this number is variable, depending on application), a malfunction message is output, because the pressure supply or the pressure detection is defective. Otherwise, the air supply is turned off and a renewed inquiry after the ideal ignition condition takes place.

In development of the invention, after the air supply and fuel supply are turned on and after ignition, the starting quantity of fuel for the burner, which depends on the rotation-speed signal of the diesel engine, is set after an inquiry for a second ideal ignition condition has taken place after the air supply has been turned on. With this procedure it is insured that, if the specified nominal value of the combustion-chamber temperature is present, a starting quantity of fuel is supplied to the burner, with which quantity reliable ignition is possible.

In development of the invention, after a specifiable time span, a conditioning quantity of fuel, which may differ from the starting quantity of fuel, is set, with which quantity the combustion chamber is heated up. After the conditioning quantity of fuel has been set, the combustion-chamber temperature is registered within a specifiable time period and, in a further specifiable time period, the actual value of the combustion-chamber temperature is compared to the nominal value of the combustion-chamber temperature. This has the advantage that, after the burner is turned on, a temperature jump in the combustion chamber is detected and the regeneration phase begins when the nominal value is exceeded. If no temperature jump takes place in the combustion chamber after the conditioning quantity of fuel has been set, the fuel supply is interrupted and the number of attempted starts is registered. If fewer than a certain specified number of attempted starts were necessary, a renewed inquiry after the second ideal ignition condition takes place. If more attempts were necessary, the particulate-filter system is turned off. After the turn-off operation, the number of attempted starts is again compared to a second specified number.

If fewer attempts than the second specified number were required, a renewed inquiry after the regeneration start conditions takes place, which inquiry begins with the comparison of the combustion-chamber temperature to the nominal value of the combustion-chamber temperature. Otherwise, there is a malfunction message. Thus it is insured that all conditions for optimal and reliable regeneration of the particulate filter are satisfied and no malfunctions are present in the regeneration system.

In development of the invention, the fuel supply is set to a regeneration quantity of fuel, as a function of the exhaust-gas temperature and the rotation speed, with which quantity the burner holds the gas-mixture temperature to a temperature level necessary for regeneration. For burner monitoring, the actual value of the combustion-chamber temperature is advantageously compared to the nominal value of the combustion-chamber temperature. Simultaneously, a temperature change value is compared to a specifiable maximum temperature value, the temperature change value being formed from a difference or a ratio of the current actual value of the combustion-chamber temperature and the temporally preceding actual value of the combustion-chamber temperature. The temperature change value thus represents the temperature change (gradient) in a certain time period. If the combustion-chamber temperature falls below the nominal value or if the change in combustion-chamber temperature is too great, there is a danger that the burner operated with the regeneration quantity of fuel will go out. For this case, the quantity of fuel is therefore switched over to the conditioning quantity and the procedure just described is repeated in order to insure reliable burner operation. If the stated comparison conditions are still not satisfied, the air supply and fuel supply and the ignition are turned off and the regeneration starting conditions are again waited for.

In development of the invention, a behind-filter temperature value, which is taken behind the particulate filter, is compared to specified behind-filter temperature values. After the specified temperature behind the filter is attained, the regeneration phase is terminated. A renewed loading phase can begin. For the cooling of the burner components, the fuel supply and the air supply remain turned on until specified conditions for the combustion-chamber temperature are satisfied. After the conditions have been attained, regeneration is stopped In development of the invention, after regeneration has been stopped, before the new calculation of the exhaust-gas backpressure from the characteristic curve, the homogeneous cooling of the particulate-filter system is waited for.

In a particularly advantageous development of the invention, a diagnosis is performed by the control device, in which diagnosis the transmitters connected to the control device, their wiring and switches (relays) are tested for open circuits and/or short circuits and, if there is a malfunction, a warning device is activated.

Testing of the transmitters before the beginning of regeneration or continuous testing has the advantage that the control device reacts appropriately to a malfunction, so that incorrect control actions of the particulate-filter system and thus damage to the particulate filter or impairments of diesel-engine operation are prevented. The reaction to a malfunction can take place in such a fashion that the control device brings the malfunction to the attention of the diesel-engine operator, with an appropriate warning device, or automatically intervenes in regeneration control.

For continuous monitoring or for test-stand purposes, the control device is provided with an interface, on which the operating values of the diesel engine and of the particulate-filter system, registered with the transmitters, are available to the operator and can be displayed with a suitable evaluation device.

It should further be pointed out that the use of the method in accordance with the invention is not restricted solely to a mono-particulate filter system, in which only one particulate filter is present. It can also be used advantageously with more than one filter.

BRIEF DESCRIPTION OF THE DRAWINGS

In what follows, the invention is explained in more detail on the basis of exemplary embodiments with reference to the Drawings.

FIG. 1 shows a general diagram and a functional diagram of a particulate-filter system. Connected downstream of diesel engine 1.0 is a particulate-filter system having particulate filter 1.1. The exhaust gases of diesel engine 1.0 are led to particulate filter 1.1 via mixing chamber 1.2. Allocated to mixing chamber 1.2 is burner 2 and combustion chamber 1.3, to which air and fuel is supplied in order to raise the combustion-chamber temperature.

Figure 1:
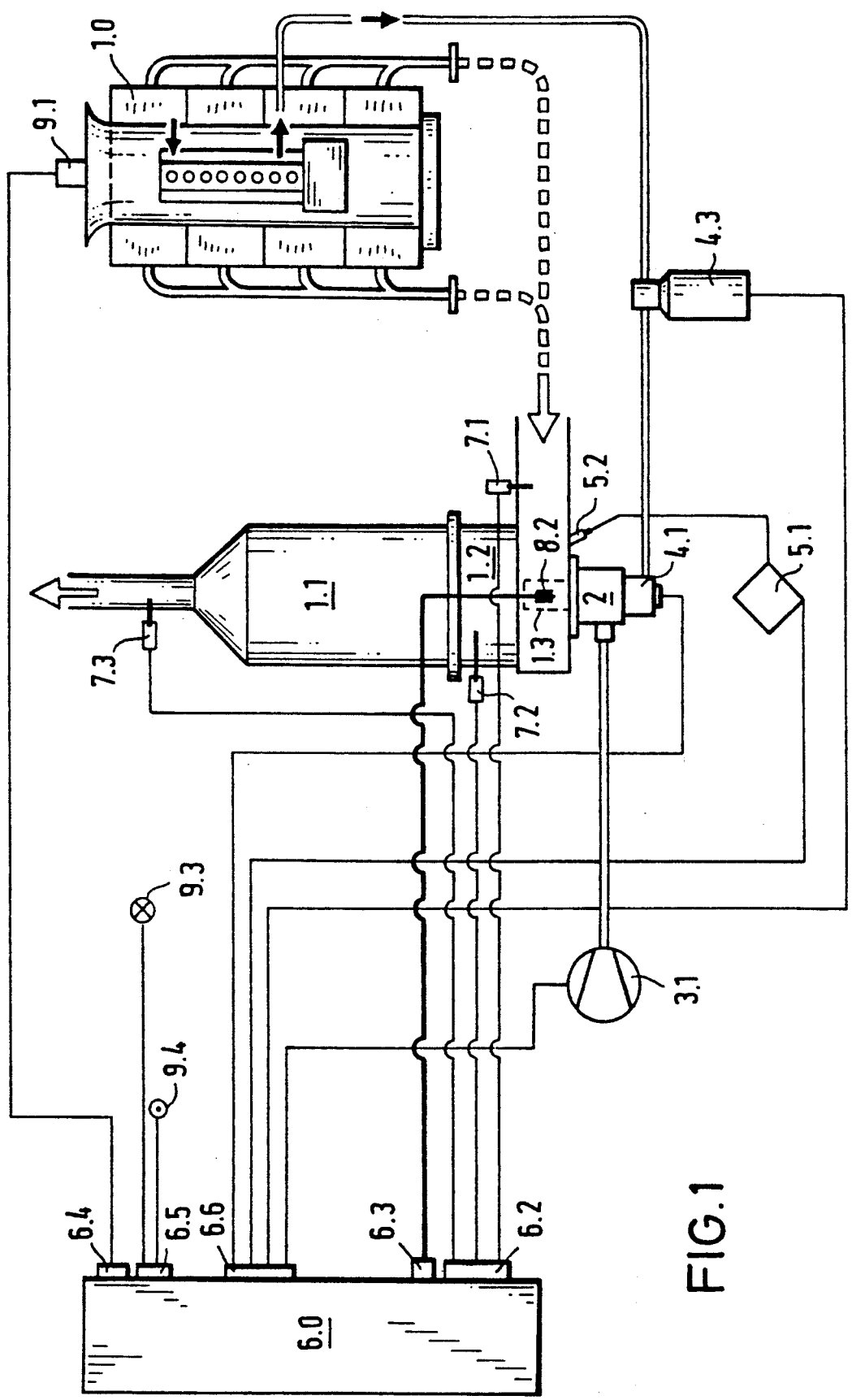
FIG. 1: General diagram and functional diagram of a diesel particulate-filter system

Air is supplied to the burner via air-delivery pump 3.1. Fuel is supplied to burner 2 via fuel metering valve 4.1, which is supplied by fuel-delivery pump 4.3. In addition to the air and fuel supply, ignition 5.1 is allocated to burner 2, which ignition controls spark plug 5.2 arranged in the burner 2. In this FIG. 1, one spark plug 5.2 is shown, wherein, however, the use of more than only one spark plug 5.2 is also conceivable.

Furthermore, the particulate-filter system exhibits control device 6.0 having diverse inputs and outputs, which are described in more detail in what follows.

Connected to one input 6.2 are various temperature transmitters for the registration of temperature signals of internal-combustion engine 1.0 and of the particulate-filter system. Exhaust-gas temperature transmitter 7.1 registers the temperature of the exhaust gas of diesel engine 1.0. A further temperature transmitter is combustion-chamber temperature transmitter 7.2, which is arranged on or in combustion chamber 1.3 and registers its temperature. Behind-filter temperature transmitter 7.3 registers the temperature prevailing behind particulate filter 1.1. Connected to a further input 6.3 of control device 6.0 is pressure sensor 8.2, which is allocated to burner 2 and registers an actual value for the exhaust-gas backpressure. At an input 6.4 of control device 6.0, operating values of the internal-combustion engine are registered with various transmitters. With rotation-speed signal transmitter 9.1, which is attached to internal-combustion engine 1.0 and registers the rotation speed of internal-combustion engine 1.0, a rotation-speed signal is supplied to input 6.4 of control device 6.0. Furthermore, control device 6.0 exhibits an output 6.5, to which there is connected a warning device, which is represented as signal lamp 9.3. Further present at this output 6.5 is diagnostic interface 9.4. On this diagnostic interface 9.4, for example, an error code, which is calculated when a malfunction message is present, can be output to a diagnostic instrument. Apart from that, this diagnostic interface 9.4 can be employed for the transmission of the registered measured values of internal-combustion engine 1.0 or of the particulate-filter system. Connected to a further output 6.6 are control lines, with which control device 6.0 can transmit control commands to the individual devices of the particulate-filter system. A first control line leads to fuel metering valve 4.1, which is, for example, controlled in clocked fashion by control device 6.0. Corresponding to this clocking, various fuel quantities can be set. A second control line leads to ignition 5.1, by which means control device 6.0 is able to control the ignition of burner 2. A third control line leads to fuel-delivery pump 4.3. A further control line is connected to air-delivery pump 3.1, so that air-delivery pump 3.1 can be turned on and off in accordance with the control commands of control device 6.0.

Control device 6.0 shown in FIG. 1 works in accordance with programmed or programmable control, which is described in more detail in the flowcharts of the following figures.

Figure 2A:
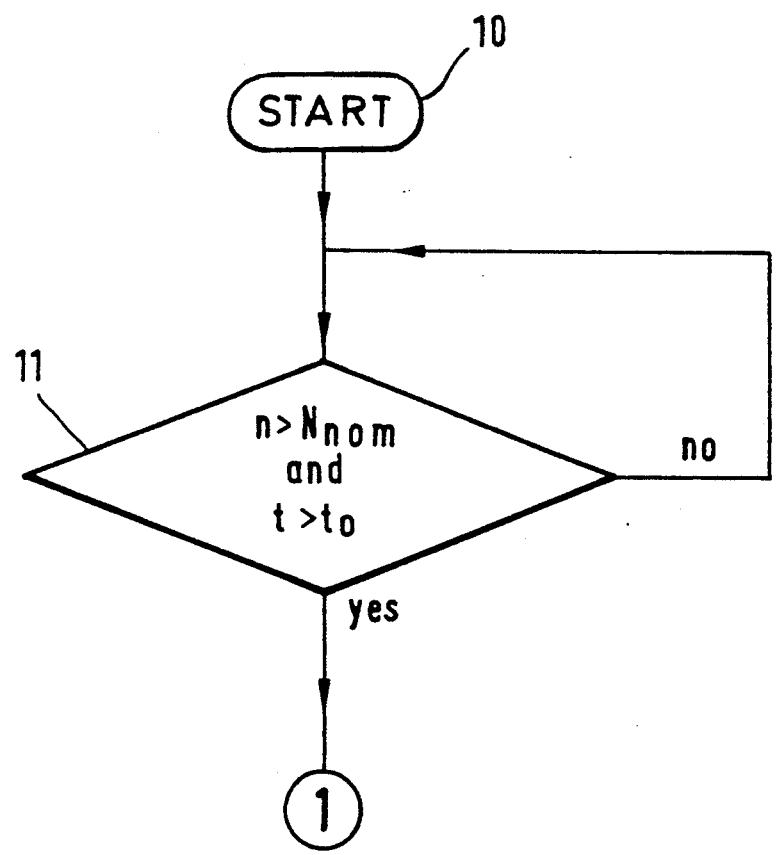
FIG. 2a: The stable operating condition of the diesel engine is sensed by measuring the passage of time and attainment of a predetermined engine speed
Figure 2:
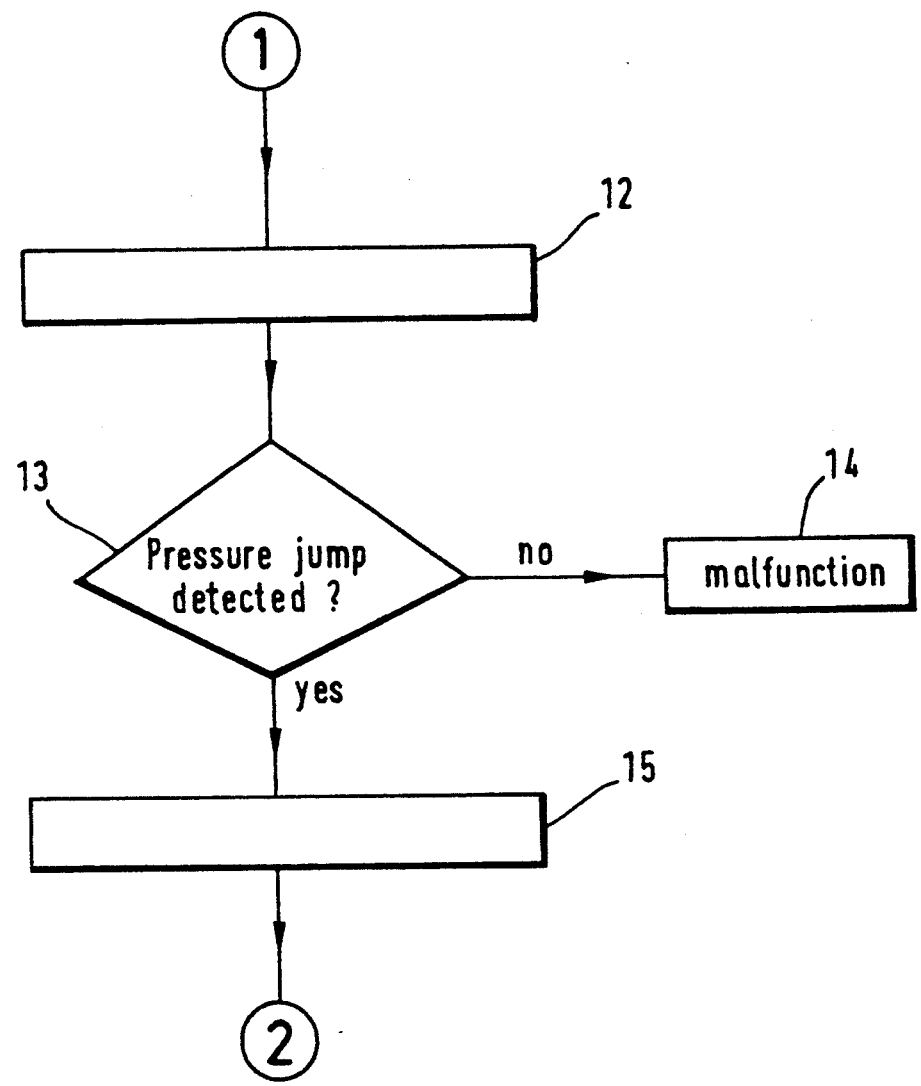
FIG. 2b: The pressure sensor is tested to determine if it is functioning correctly
FIG. 2c: Loading detection of the particulate filter is determined by comparing actual exhaust gas back pressure against a calculated nominal value
FIG. 2d: Regeneration starting conditions depend on predetermined combustion chamber temperature, passage of time and ideal ignition conditions.
FIG. 2e: The air supply is turned on and its pressure is tested.
FIG. 2f: Inquiry is made as to the existence of an ideal ignition condition for the burner
FIG. 2g: The combustion chamber is tested for the proper operation
FIG. 2h: One cycle of regeneration monitoring of the particulate filter is shown.
FIG. 2i: The shut down of the particulate filter system is illustrated.

FIG. 2a shows waiting for a stable operation condition of diesel engine 1.0. Control of the particulate-filter system takes place at starting point 10, which can be both a separate main program and also the beginning of a subprogram. The signal n output by rotation-speed signal transmitter 9.1 and a specifiable time period t 0 are used as criteria for a stable operating condition of diesel engine 1.0. As long as the conditions (n nom, t 0) are not satisfied, control remains in loop 11, while control passes to point 1 upon fulfillment of the condition. Here n nom is, for example, the idling rotation speed of a diesel engine or a fixed and constant specified value.

At point 1, pressure sensor 8.2 is tested as shown in FIG. 2b. For this purpose, air-delivery pump 3.1 is turned on with control command 12 of control device 6.0. At branch point 13, control device 6.0 checks whether a pressure jump has occurred at connected pressure sensor 8.2. If this is not the case, control device 6.0 detects a malfunction 14 and outputs, for example, an appropriate signal at signal lamp 9.3 or on diagnostic interface 9.4. If a pressure jump was detected at branch point 13, there is a control command 15 to air-delivery pump 3.1, which command turns said pump off. Control next passes to point 2.

Figure 2C:
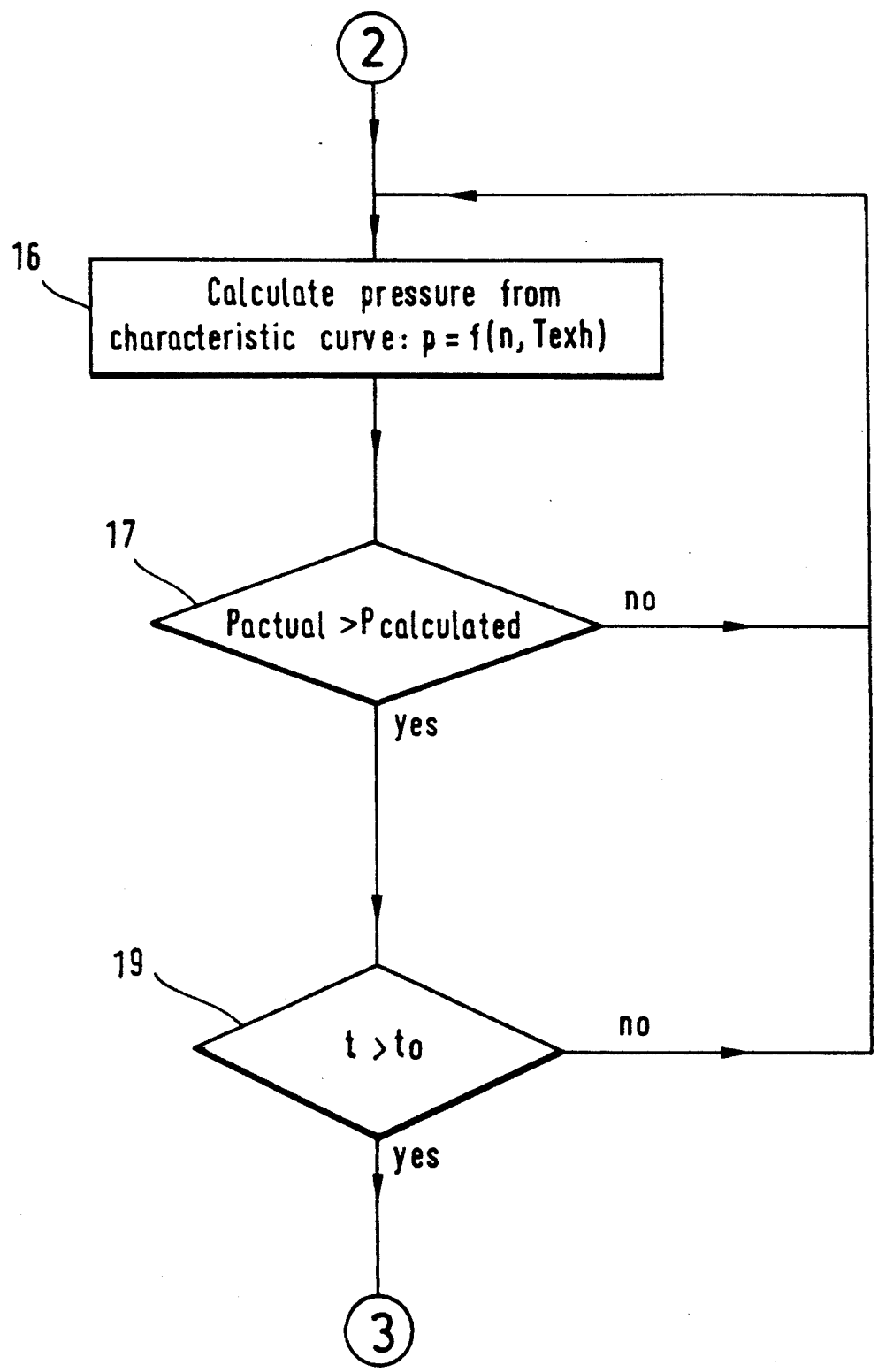

Point 2 is the beginning of the loading detection of particulate filter 1.1, shown in FIG. 2c. There follows a calculation 16 of the nominal value for the exhaust-gas backpressure, from a characteristic curve programmed in control device 6.0, as a function of the exhaust-gas temperature and the rotation speed, which are registered with exhaust-gas temperature transmitter 7.1 and rotation-speed signal transmitter 9.1. Next, at branch point 17, the calculated nominal value for the exhaust-gas backpressure is compared to the actual value of the exhaust-gas backpressure registered by pressure sensor 8.2. If the calculated nominal value is greater than the registered actual value of the exhaust-gas backpressure, there is a branch from branch point 17 to point 2. If the registered actual value is greater than the calculated nominal value, the time is accumulated by, for example, incrementing a counter by one clock cycle with each pass. At subsequent branch point 19, an inquiry takes place as to whether the accumulated time has reached the specified value t 0. If this is not the case, control branches to point 2; otherwise, it proceeds with point 3. The time accumulation has the advantage that the exhaust-gas backpressure is calculated and compared to the actual value during the specified time period t 0, so that sudden fluctuations of the exhaust-gas backpressure, which can result, for example, from sudden load changes of diesel engine 1.0, cannot lead to a premature beginning of regeneration.

Figure 2D:
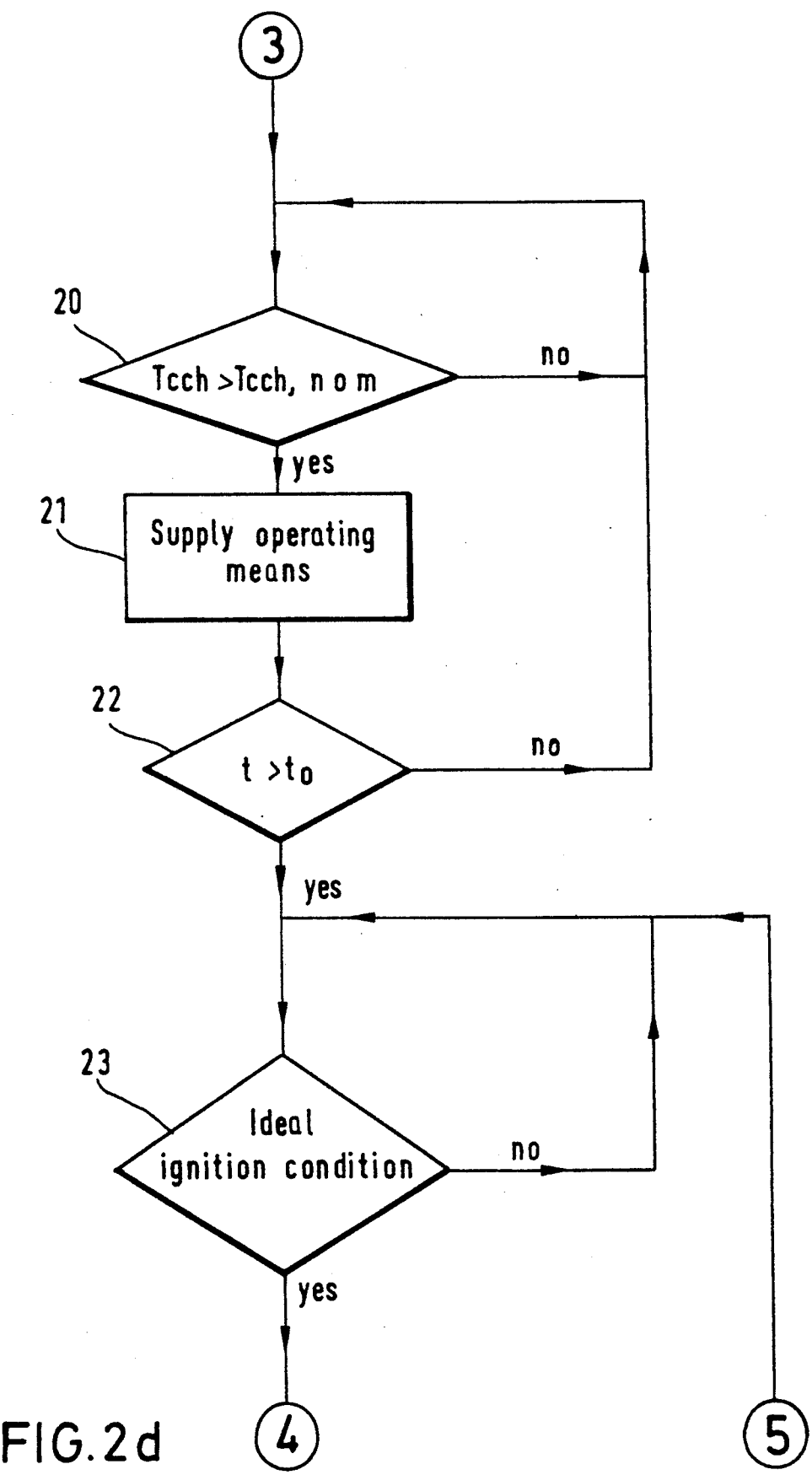

FIG. 2d shows the regeneration start conditions, which begin at point 3. At branch point 20, the actual value of the combustion-chamber temperature, registered with combustion-chamber temperature transmitter 7.2, is compared to the specifiable nominal value of the combustion-chamber temperature. As long as the nominal value is greater than the actual value, control remains at this branch point 20. If the combustion-chamber temperature exceeds the specified nominal value, operating means are delivered to the particulate-filter system with control command 21. At branch point 22, an inquiry takes place as to whether the specified time span t 0 has elapsed with the time accumulation. If this is not the case, control branches to point 3. If the specified time span t 0 has elapsed, control passes to branch point 23, at which an inquiry is made for an ideal ignition condition of burner 2. An ideal ignition condition is to be understood as conditions under which burner 2 can be reliably started (adequate air supply and fuel supply, appropriate combustion-chamber temperature level). This inquiry at branch point 23 takes place until the ideal ignition condition of burner 2 has been reached, so that control can pass to point 4.

Figure 2E:
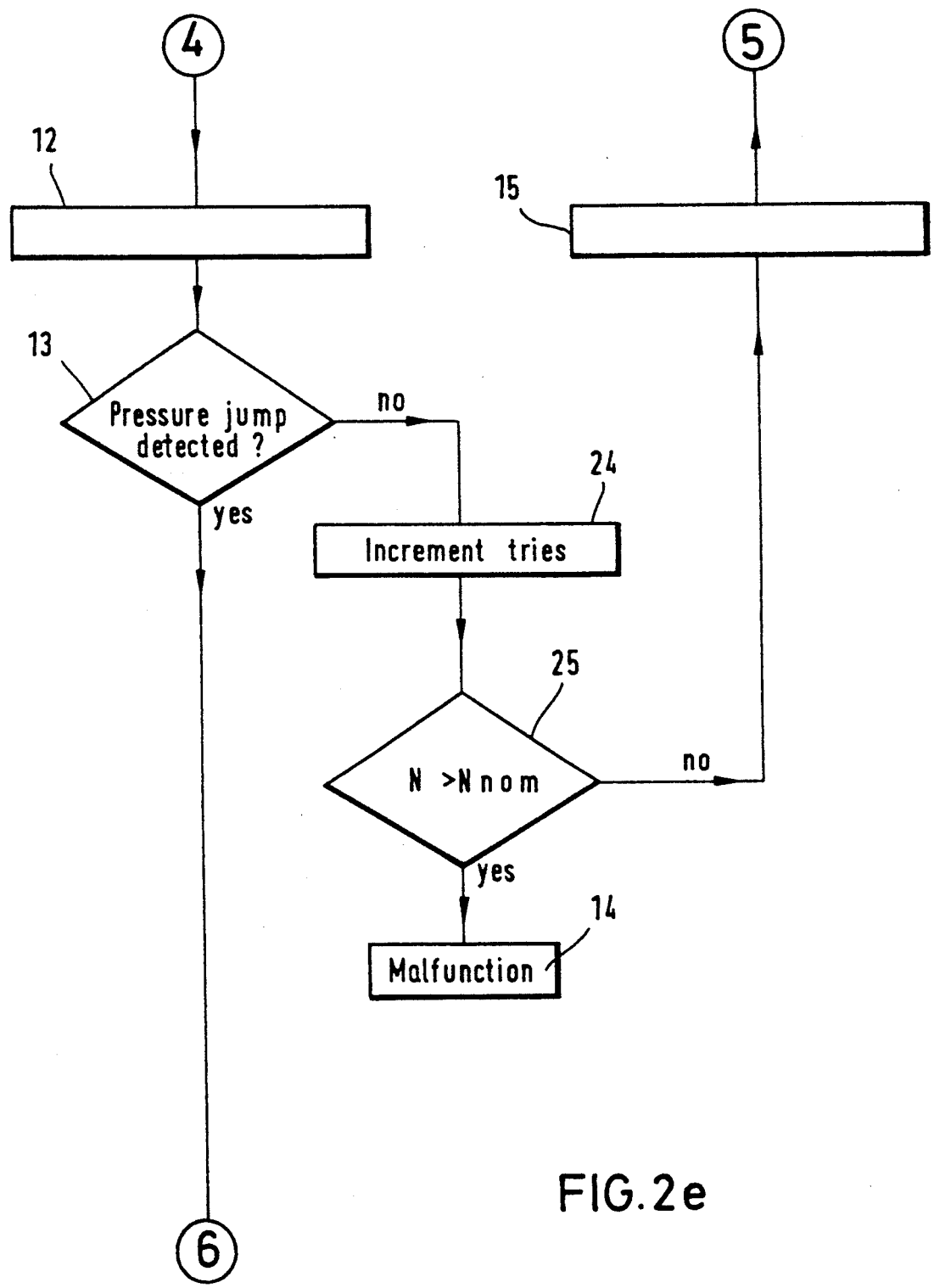

After point 4, as shown in FIG. 2e, the air supply is turned on and tested. Air-delivery pump 3.1 is turned on for this purpose with control command 12, and a pressure jump at pressure sensor 8.2 is waited for. The expected pressure jump is verified by branch point 13. If the expected pressure jump occurs, control passes to point 6. If branch point 13 detects no pressure jump, the number N of attempts is counted at the point designated 24. At branch point 25 following point 24, the number N of attempted starts is compared with a specified number N nom. If the number of attempted starts was greater than the specified value, there is a malfunction message 14. If the number of attempts was smaller than the specified value, air-delivery pump 3.1 is turned off with control command 15 and control passes to point 5, which lies between branch point 22 and branch point 23, which were described in FIG. 2d.

Figure 2F:
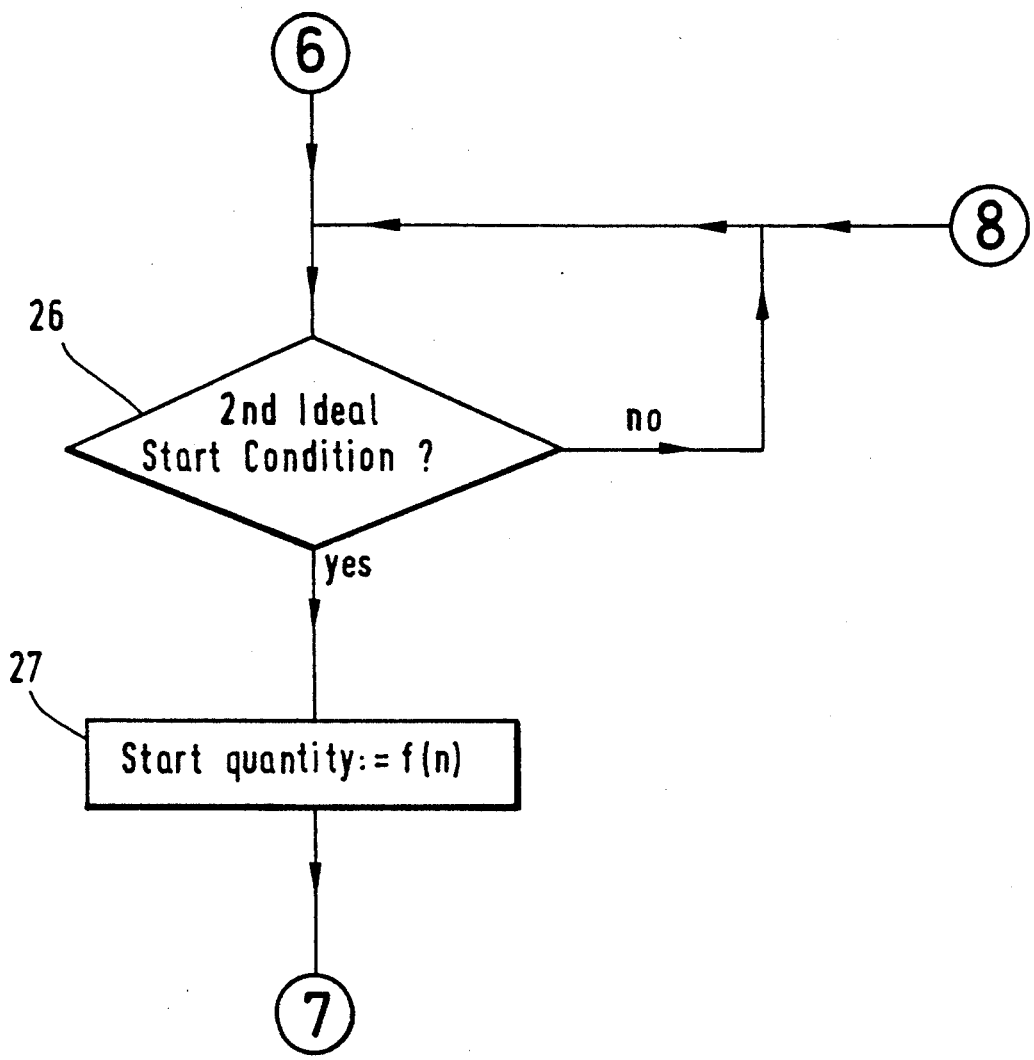

Point 6 in FIG. 2f begins waiting for the ideal ignition condition of burner 2. With branch point 26, an inquiry is made in accordance with branch point 23 as to whether a second ideal start condition exists. This inquiry occurs until the second ideal start condition exists. When the second ideal start condition exists, a start quantity is set by control command 27, which start quantity is dependent on at least the rotation speed. After control command 27, control passes to point 7.

Figure 2G:
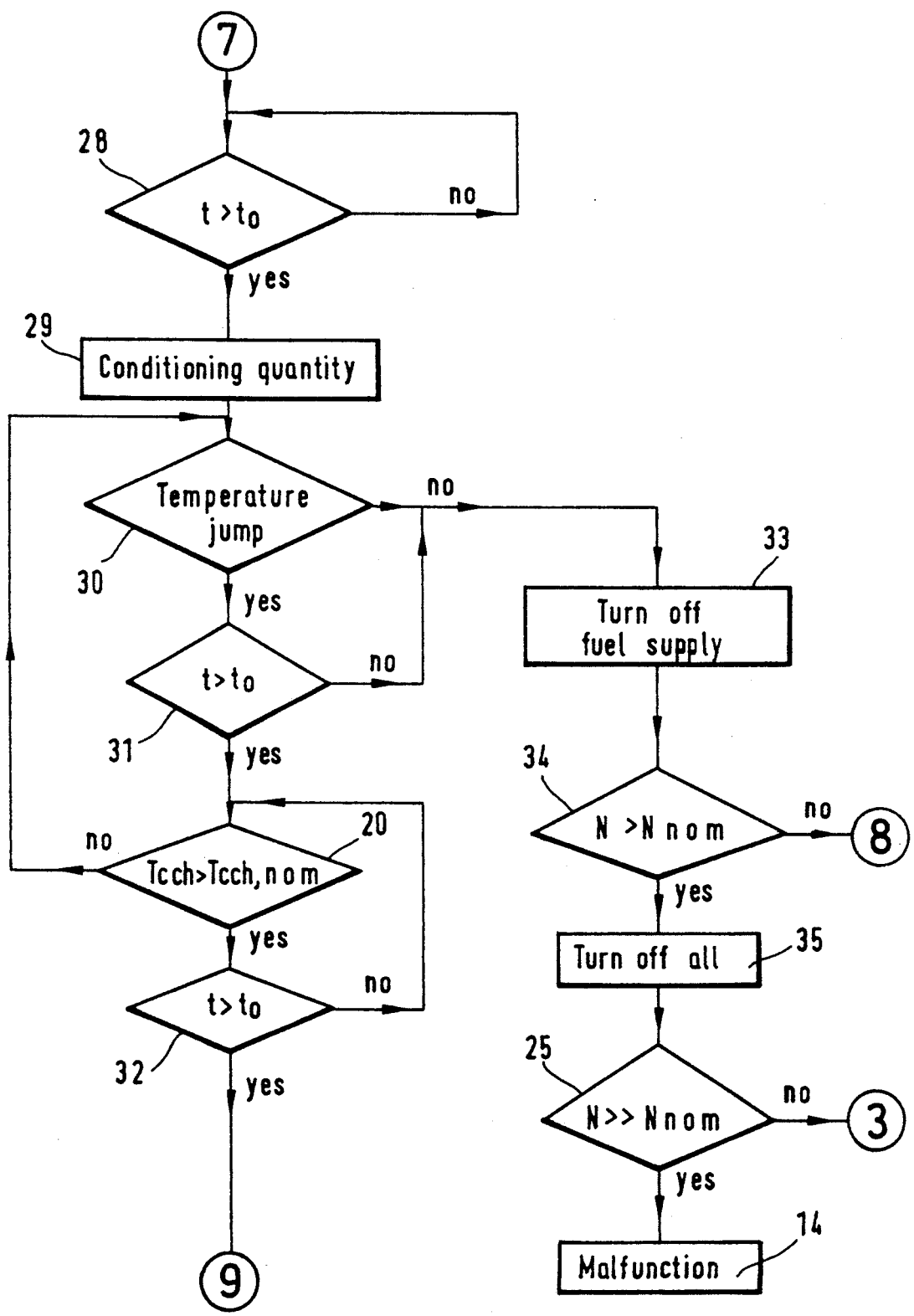

FIG. 2g shows the heating of the combustion chamber, which begins with point 7. First, at branch point 28, an inquiry is made as to whether the specified time span t 0 has elapsed. If this is the case, a conditioning quantity, which is smaller than the starting quantity and with which burner 2 can be operated reliably, is set by control command 29. Next, at branch point 30, an inquiry is made as to whether a temperature jump has taken place in the combustion chamber. At following branch point 31, an inquiry is then made as to whether this temperature jump has taken place within the specified time span t 0. If the temperature jump has not taken place either directly or within the specified time span t 0, the fuel supply is turned off by control command 33. Next, at branch point 34, the inquiry takes place as to whether more than a specified number (N nom) were necessary for the starting of burner 2. If this was not the case, control branches to point 8, which in FIG. 2f lies between point 6 and branch point 26. If more attempts were necessary to start burner 2, control command 35 comes from control device 6.0, which command turns off the particulate-filter system. After control command 35, at branch point 25, an inquiry again takes place as to whether more than the specified number of attempts were necessary to start burner 2. If fewer attempts were necessary, control branches to point 3, which is shown in FIG. 2d. If more attempts were necessary, again the malfunction message designated 14 is output. If the expected temperature jump took place within the specified time span t 0, the registered combustion-chamber temperature is next compared to the nominal value of the combustion-chamber temperature by branch point 20. If the combustion-chamber temperature lies below the specified nominal value, control jumps to a point between control command 29 and branch point 30. If the actual value of the combustion-chamber temperature exceeds the nominal value, an inquiry is made at branch point 32 as to whether the specified time period t 0 has elapsed. If this period has not yet elapsed, control branches to a point between branch point 31 and branch point 20. If the time period has already elapsed, control passes to point 9.

Figure 2H:
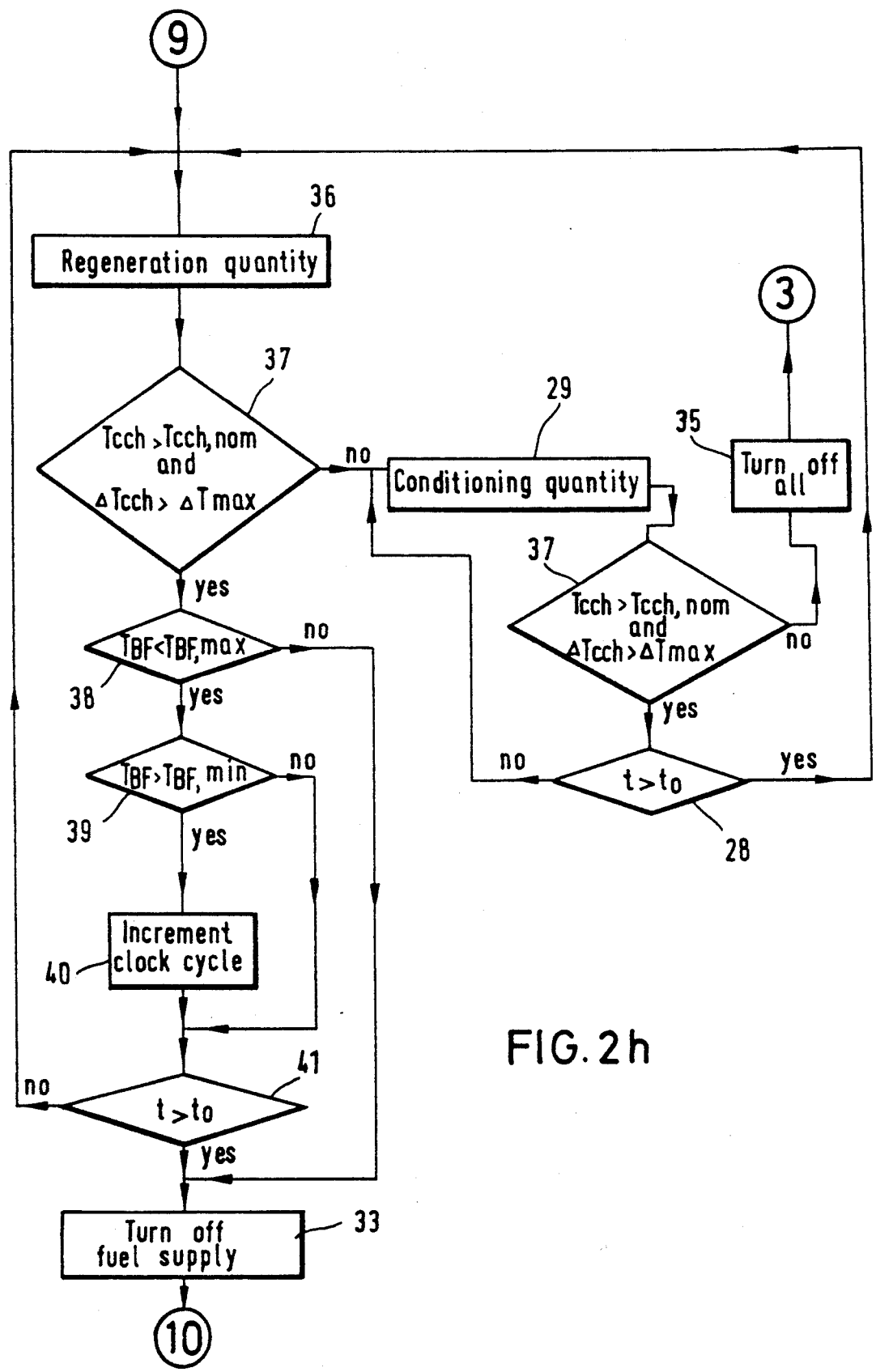

FIG. 2h shows regeneration monitoring (regeneration phase), which begins at point 9. One cycle of regeneration monitoring consists of the steps described in what follows. First, the regeneration quantity is set by control command 36. This is a fuel quantity that is set as a function of the exhaust-gas temperature and the exhaust-gas mass and insures reliable maintenance of the gas-mixture temperature at the regeneration level. At branch point 37, an inquiry in accordance with branch point 20 takes place (comparison of registered combustion-chamber temperature to the nominal combustion-chamber temperature) and, additionally, an inquiry takes place as to whether a temperature-change value #T cch is greater than a maximum temperature value #T max. The temperature-change value #T cch is the difference or the ratio of combustion-chamber temperatures from two successive inquiry cycles. This temperature-change value #T cch is compared to the constant and specified maximum temperature value #T max. If both conditions of branch point 37 are fulfilled, then at branch point 38 the temperature behind the filter, registered with behind-filter temperature transmitter 7.3, is compared to a specifiable maximum behind-filter temperature value. If the temperature behind the filter is lower than the maximum behind-filter temperature value, the inquiry takes place at branch point 39 as to whether the behind-filter temperature is higher than a specified minimum behind-filter temperature value. If this is the case, a clock cycle is incremented at a point designated 40. At branch point 41, control branches to point 9 until the specified time period t 0 at branch point 41 has been reached. If the specified time period is overrun, the fuel supply is turned off by control command 33 and control passes to point 10. If at branch point 38 the inquiry as to whether the behind-filter temperature is lower than the maximum behind-filter temperature receives a negative answer, control branches to a point between branch point 41 and control command 33. Control likewise branches to a point between point 40 and branch point 41 if the behind-filter temperature is lower than a minimum behind-filter temperature. If it was found at branch point 37 that the combustion-chamber temperature is lower than the specified nominal value of the combustion-chamber temperature and that the temperature-change value #T cch is smaller than the maximum temperature value #T max, control branches to control command 29, with which a conditioning fuel quantity is set. After the setting has been done, an inquiry is again performed at branch point 37 as to whether the conditions described are fulfilled. If the conditions are fulfilled, an inquiry takes place at branch point 28 as to whether a specified time span t 0 has elapsed. As long as this time span has not elapsed, control branches to a point between the "no" exit of branch point 37 and control command 29. If the time span t 0 is exceeded, control branches to point 9, so that a new entry into regeneration monitoring can begin. If the conditions of branch point 37 are not fulfilled, control passes to control command 35 and then to point 3, at which the regeneration start conditions shown in FIG. 2d are waited for.

Figure 2I:
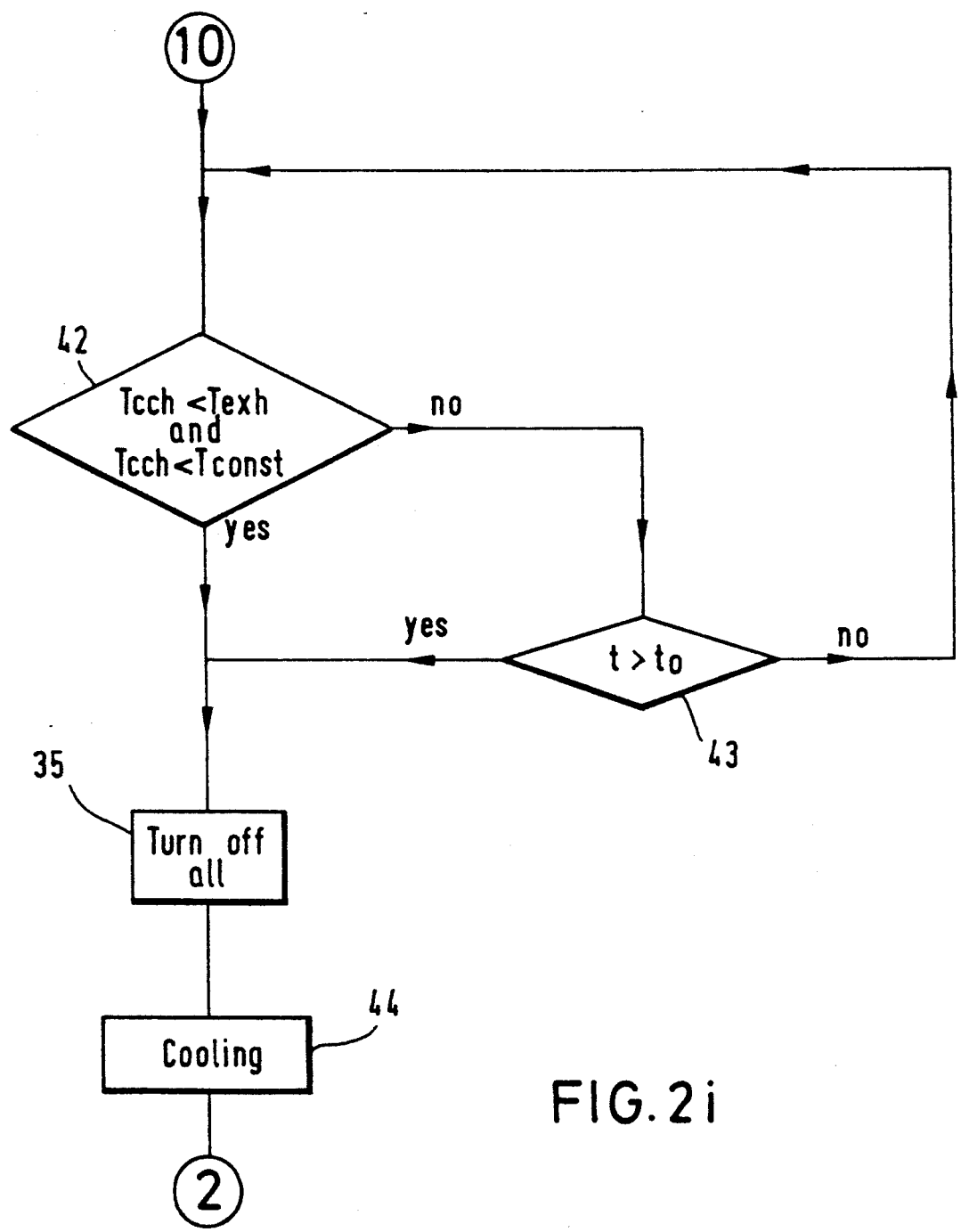

After the termination of regeneration monitoring at point 10, the inquiry for a regeneration stop takes place as described in FIG. 2i. From point 10, control passes to branch point 42, at which an inquiry takes place as to whether the combustion-chamber temperature is lower than the exhaust-gas temperature registered by exhaust-gas temperature transmitter 7.1, and whether the combustion-chamber temperature is lower than a specified temperature value T const. If both conditions of the inquiry are fulfilled, control passes to control command 35, with which the particulate-filter system is turned off. After control command 35, control passes to point 2. If one or both conditions of branch point 42 should not be fulfilled, control branches to branch point 43, with which an inquiry is made as to whether the specified time span t 0 has elapsed. For the case that the time span t 0 is exceeded, control branches to control command 35. Next follows cooling 44 of the particulate-filter system. If the time span t 0 has not yet been exceeded, control passes from branch point 43 to a point between point 10 and the entry to branch point 42.

It should also be pointed out that all specified or specifiable constant values for the rotation speed (n nom), time t 0, number (N nom) or temperature shown in FIGS. 2a to 2i can vary over wide ranges, depending on the application. Several different constant values are also specifiable for a single quantity.

What is claimed is:

1. A method for the regeneration of a particulate-filter system for the exhaust gases of a diesel engine, said system including a burner (2) having an air-delivery pump (3.1), a fuel-delivery pump (4.3), a fuel metering valve (4.1), a pressure sensor (8.2) measuring the exhaust gas back pressure at said burner (2), a particulate filter (1.1), and a control device (6.0), wherein said burner (2) is locate in the exhaust-gas stream ahead of said particulate filter (1.1) and regeneration takes place by means of burning off of the deposited soot particles in said exhaust-gas stream and said control device (6.0) activates said burner (2) during a certain burning period in dependence on at least the exhaust-gas back pressure that prevails ahead of said particulate filter (1.1), said method comprising the steps of:

attaining a stable operating condition of said diesel engine (1.0) within a predetermined time period after the starting of said diesel engine (1.0), said stable operating condition being detected by said control device (6.0) receiving rotation-speed signals of predetermined magnitude, testing said pressure sensor (8.2) through a command by said control device (6.0) which causes running of said air-delivery pump (3.1), said command being delivered automatically upon said engine attaining said stable operating condition, detecting a loaded condition of said particulate filter by said control device (6.0) sensing an exhaust gas backpressure in excess of a predetermined value and a combustion chamber temperature in excess of a predetermined value, operating said burner (2) to heat said combustion chamber (1.2) by said command device (6.0) activating delivery of fuel and air to said burner (2) and causing ignition of the latter and stopping operation of said burner (2) by said command device (6) in response to a passage of a predetermined time period and to the combustion chamber temperature being lower than the exhaust gas temperature and lower than a predetermined temperature.

2. A method for the regeneration of a particulate-filter system in accordance with claim 1, characterized by the fact that a nominal value for he exhaust-gas backpressure is calculated form a characteristic curve, as a function of the operating values of the diesel engine (1.0).

3. A method for the regeneration of a particulate-filter system in accordance with claim 1, characterized by the fact that the control device (6.0) registers an actual value of the exhaust-gas backpressure and compares said actual value to the nominal value of the exhaust-gas backpressure calculated from a characteristic curve programmed in said control device (6.0).

4. A method for the regeneration, of particulate-filter system in accordance with claim 3, characterized by the fact that the calculations of the nominal exhaust-gas backpressure and the nominal/actual value comparison are performed in a specified time period.

5. A method for the regeneration of a particulate-filter system in accordance with claim 1 wherein the actual value of the combustion-chamber temperature is compared to a specifiable nominal value for the combustion-chamber temperature.

6. A method for the regeneration of a particulate-filter system in accordance with claim 5, characterized by the fact that, in order to heat the combustion chamber (1.2), the burner (2) is activated for a specified time span by a control command of the control device (6.0), the air supply as well as the ignition of the burner (2) being activated.

7. A method for the regeneration of a particulate-filter system in accordance with claim 1, characterized by the fact that the air-delivery pump (3.1) is turned on by the control command of the control device (6.0) and then a control command is output in order to set a starting quantity of fuel for the burner (2) in dependence on the rotation-speed signal.

8. A method for the regeneration of a particulate-filter system in accordance with claim 1, characterized by the fact that, after a specified time span, a control command for setting a conditioning quantity of fuel, which is smaller than the starting quantity of fuel, is output and the combustion-chamber temperature is registered within a specifiable time period, and the actual value of the combustion-chamber temperature is compared to the nominal value in a further specified time period, and a regeneration phase begins if the nominal value is exceeded.

9. A method for the regeneration of a particulate-filter system in accordance with claim 1, characterized by the fact that a variable regeneration quantity of fuel is set during the regeneration phase, and the actual value of the combustion-chamber temperature is compared to the nominal value, and a temperature-change value is compared to a specifiable maximum temperature value.

10. A method for the regeneration of a particulate-filter system in accordance with claim 1 wherein during regeneration an exhaust-gas temperature value is picked up downstream of the particulate filter and is compared to minimum and maximum temperature values.

11. Method for the regeneration of a particulate-filter system in accordance with claim 1, characterized by the fact that a cooling of the particulate-filter system is waited for after the regeneration stop has occurred and prior to a new calculation of the exhaust-gas backpressure from the characteristic curve programmed in said control device (6.0).

12. A method for the regeneration of particulate-filter system in accordance with claim 1, characterized by the fact that a diagnosis is performed by the control device (6.0), in which diagnosis at least the transmitters of the particulate-filter system and of the diesel engine (1.0)

are tested for cable breaks and short circuits and a warning device in particular a signal light (9.3), is activated in case of a malfunction.

13. A method for the regeneration of a particulate-filter system in accordance with claim 1, characterized by the fact that the control device (6.0) exhibits an interface (9.4) via which data are transmittable, which data represent the normal operating mode and any malfunction of the particulate-filter system.

* * * * *

UNITED STATES PATENT AND TRADEMARK OFFICE
CERTIFICATE OF CORRECTION

PATENT NO. : 5,211,009
DATED : May 18, 1993
INVENTOR(S) : Hans Houben, Heinrich Berendes, Reinhard Pusch, Axel Rodemeister It is certified that error appears in the above-identified patent and that said Letters Patent is hereby corrected as shown below:

Column 9, line 30, cancel "locate" and substitute --- located ---;

Column 9, next to last line, cancel "he" and substitute --- the ---;

Column 9, last line, cancel "form" and substitute --- from ---.

Signed and Sealed this

First Day of February, 1994

Attest:

BRUCE LEHMAN

Attesting Officer     Commissioner of Patents and Trademarks